United States Patent [19]

Woodward

[11] 3,781,485

[45] Dec. 25, 1973

[54] TRUNK SELECTION SCANNING CIRCUIT

[75] Inventor: John W. Woodward, Schaumburg, Ill.

[73] Assignee: GTE Automatic Electric Laboratories Incorporated, Northlake, Ill.

[22] Filed: Aug. 9, 1972

[21] Appl. No.: 279,113

[52] U.S. Cl. .......... 179/18 FG
[51] Int. Cl. .......... H04m 3/22
[58] Field of Search .......... 179/18 FF, 18 FG, 179/18 G, 18 HA, 18 AB, 18 AH, 27 D

[56] References Cited

UNITED STATES PATENTS

| | | | |
|---|---|---|---|
| 3,718,907 | 2/1973 | Altenburger | 340/147 R |
| 3,626,378 | 12/1971 | Salle et al. | 340/172.5 |

*Primary Examiner*—Thomas W. Brown
*Attorney*—K. Mullerheim et al.

[57] ABSTRACT

A scanning circuit for selecting outgoing or two way trunk circuits in a crosspoint switching system, where two attempts are made to select an idle trunk. The first scan is made in one direction, with the second scan made in the reverse direction.

9 Claims, 1 Drawing Figure

PATENTED DEC 25 1973 3,781,485
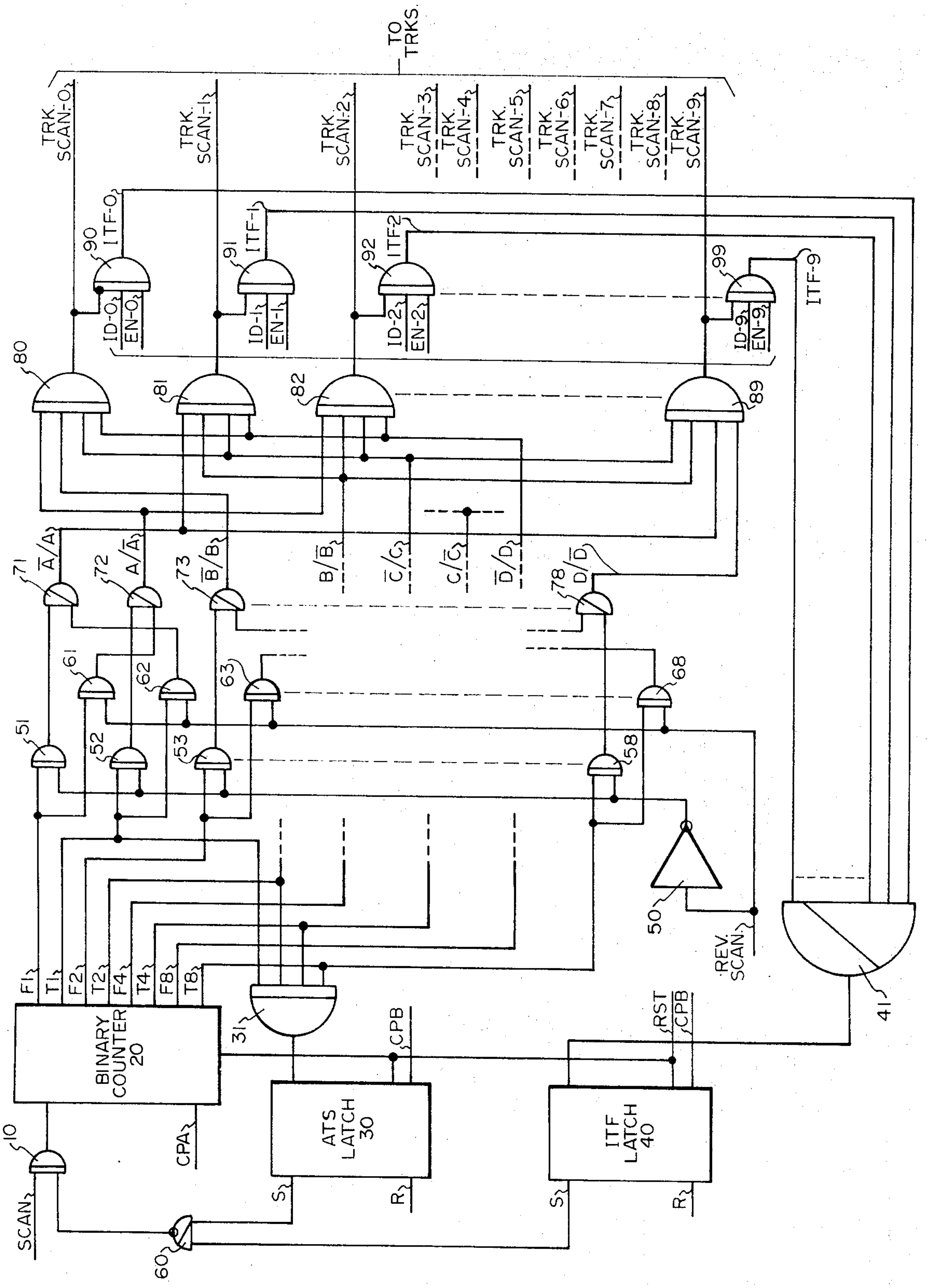

TRUNK SELECTION SCANNING CIRCUIT

BACKGROUND OF THE INVENTION

1. Field of the Invention

This invention relates to telephone systems and more particularly to a technique for the selection of idle trunk circuits.

2. Description of the Prior Art

The use of scanning circuitry for selection of outgoing trunks in a telephone system is well known. Typically trunk circuits are provided with a lead extending to a scanning circuit that indicates the idle or busy condition of the trunk circuit. Consequently, before a transmission path is completed to a trunk circuit, the scanning circuitry is employed to individually and sequentially test the leads to determine if a busy or idle condition exists on the trunk circuits within the group being scanned. If a busy condition exists, the scan continues, testing each trunk until a trunk in the idle condition is found. At this time the system control circuitry is advised that trunk has been found and necessary switching of the transmission path to the selected and idle trunk circuit takes place.

As may be obvious, in a typical scanning operation each scan begins with the first trunk (for example in a group of ten) and concludes with either the finding of an idle trunk or alternately the discovery that all ten trunks are busy. Since the usage of each trunk circuit varies with the duration of the telephone call involved some variation in the sequence of availability of trunks will undoubtedly take place. However, as may be obvious the first circuits in each trunk group are more liable to be selected consistently and therefore are more prone to be in the busy condition than later trunks in the group due to the normal technique of sequential scanning and selection. That is to say that trunks, 1, 2 and 3, etc. will normally be the busiest trunks, while trunks 9 and 10 in the end of the trunk group will frequently be the idle trunks. While this is not a serious shortcoming, the speed of trunk scanning selection circuitry of prior art telephone systems is reduced, because of this mode of operation.

SUMMARY OF THE INVENTION

Accordingly it is an object of the present invention to provide a technique for scanning telephone trunks so that the overall scan time is minimized, thus increasing system speed.

This and other objects of the present invention are realized in a specific embodiment thereof that utilizes the following described techniques of the present invention to meet the above objects. The present invention is an asymmetrical reversible scanning circuit. The present technique is intended for use in a common control crosspoint form of telephone switching system. However its usage is not necessarily limited to that form of system. As in conventional systems it seizes the first trunk in the group which is both idle and enabled. The idle condition being a recognition of the fact that the trunk is not in usage and the enabled condition being in a condition ready for operation or use.

In at least one form of telephone system to which the present invention is applicable, the trunks within a given group are numbered zero through nine inclusive and this is the normal direction of scan. On second attempt conditions, however, in the present invention the scan is reversed (i.e. from 9 to 0). This technique substantially improves the marker and trunk group traffic distribution.

The present circuitry achieves reverse scanning by inverting the outputs from a binary counter prior to the inputting the outputs to the decoding gates employed in the scanner circuitry. The decoding is arranged in asymmetrical manner so that the overall scan time is substantially minimized during the forward mode. This is done inasmuch as the forward mode is used more frequently than the reverse mode.

In the present invention a binary counter is normally activated in response to an incoming signal from a sequence state control device that may form a part of the common control equipment of the telephone system. This signal is an indication that a trunk must be selected and that the present scan circuitry is required to make that selection.

The incoming signal will cause the binary counter to alternately produce true and false outputs on leads extending to gate circuitry that is normally enabled for the scan in the forward direction. The binary outputs from the gates are combined in such a manner to select sequentially the trunks in the groups associated with the scanning circuitry. Associated with each trunk is a lead indicating whether that trunk is idle or not. That signal along with the trunk selection signal derived from the binary counter is combined with a signal indicating whether or not the trunk has been enabled, and if all conditions are true (i.e. the trunk is idle, the trunk has been selected and the trunk is enabled) then actual trunk seizure and connection through the associated switching circuitry of the telephone system take place. If, however, the trunk is busy or not enabled, no action takes place and with the next advance of the binary counter this sequence continues until an idle trunk is found or until all 10 trunks (0 through 9 inclusive) have been scanned after which the binary counter will be reset to its all zero or reset state and await another incoming scan pulse. If, however, the attempt to establish a matrix connection subsequently fails, the register sender associated with the switching circuitry of the telephone system requests that a second attempt be made to connect the call, and the binary counter will be reoperated from the common control equipment. At this time, however, the reverse scan signal will cause the gating connected to the output to the binary counter to be controlled in such a manner that the binary outputs will be presented in a different sequence to the output gates that extend to the trunk circuits. In reverse scan condition the output gate for trunk 9 will be actuated first followed by trunk 8, trunk 7, etc. Again the scan will continue until an idle trunk is found or until all trunks in the group have been scanned. Again, if no idle trunk has been found the binary counter will be reset to 0 and the common control equipment will employ similar circuitry to that shown herein to access a different trunk group.

BRIEF DESCRIPTION OF THE DRAWING

The accompanying drawing is a combined symbolic logic and block diagram of a trunk scanning circuit used for selecting an idle trunk circuit in a telephone system, in accordance with the present invention.

DETAILED DESCRIPTION

Referring now to the accompanying drawing there is shown a scan input to AND gate 10. This scan input is received from the common control or sequence state control equipment of the marker circuitry that includes the present trunk scanning circuit. It should be understood that the sequence and supervisory control circuit produces a variety of controlled outputs for the telephone system circuitry, advancing from one sequence to another as each task is performed.

It is during the requirment for the task of the trunk selection that the sequence state control equipment provides the scan input. It should also be assumed that a reset pulse also received from the common control equipment has been previously received and applied to binary counter 20, ATS (all trunks scan) latch 30 and ITF (idle trunk found) latch 40 so that the circuitry of the present invention is in its reset or idle state.

With both ATS latch 30 and ITF latch 40 in their reset condition a zero or false output will be present on the S leads extending from both latches to OR gate 60, inasmuch as this gate has an inverted output a true signal will then be present along with the scan input at AND gate 10 whose output is connected to binary counter 20. Therefore when the next A clock pulse (CPA) is connected to binary counter 20, the counter will be incremented to its first count.

Binary counter 20 may take any conventional form of construction, the details of which do not form a part of the present invention. When the binary counter 20 operates in response to its first input pulse a true output appears on lead T1 that is connected to the input of AND gate 52. Assuming that this is the initial scan row in a second scan, a zero input will be present on the reverse scan lead coming from the control equipment. By means of inverter 50 this is changed to a true or one input and applied to inputs of gates 51 through 58 inclusive. (It should be noted that gates 54 through 57 are not shown for the sake of brevity. Likewise gates 62 through 67, 74 through 78, 83 through 88 and 93 through 98 are also not shown.) With the presence of a true or one input on gate 52 the true output on lead T1 from the binary counter 20 is extended to OR gate 72. The presence of this signal on OR gate 72 will produce an output on the A/A NOT lead which is distributed in accordance with the decoding scheme to the decoding gates 80 through 89 inclusive. It should be noted that the coding gate 80 has its inputs connected to OR gate 72 as well as OR gate 73 at OR gates 75 and 77 which are not shown. OR gates 73, 75 and 77 have inputs that are connected to outputs F2, F4 and F8 respectively. Since the remainder of the binary counter is in its reset stage complementary or false outputs will be present on the F2, F4 and F8 leads providing the necessary combination of inputs to gate 80. With the presence of a true condition on all inputs to gate 80, a trunk scan signal is presented to the zero trunk. This signal is also conducted to AND gate 90 which has additional inputs IDO connected to trunk zero over which an indication of busy or idle condition is provided and over enable lead ENO to the control equipment.

If true outputs are present on IDO and ENO and an output is produced by gate 80, AND gate 90 will now produce an output on the ITFO lead indicating that an idle trunk has been found. This information is connected to the input of OR gate 41 whose output is connected to the idle trunk found latch 40. Inasmuch as latch 40 was previously reset it will on the occasion of the next B clock pulse (CPB) cause latch 40 to set providing a true input at OR gate 60 whose inverted output will result in a false or zero output being applied to gate 10 thus blocking the incoming scan signal from the control equipment. The resultant effect being that binary counter 20 will be stopped.

Now assuming that an idle trunk had not been located in connection with trunk 0 the next incoming CPA clock pulse would advance the binary counter 20 and a true output would appear on lead T2 where through gates 54 and 74 (not shown) an input would appear on leads B/BNOT extending to gate 81. Inasmuch as the binary counter at the count of 2 would have true inputs on its F1, F4 and F8 leads, inputs from gates 71, 75 and 77 as well as the true input from gate 74 would all be present at the inputs to AND gate 81 resulting in an output from the trunk scan lead to trunk No. 1. As described previously if this trunk is idle and enabled an output will appear from gate 91 and through OR gate 41 will be conducted to ITF latch 40 where on the occasion of the next CPB clock pulse operation of the binary counter will be terminated in the manner previously described.

If however trunk No. 1 is also busy, the binary counter 20 will be incremented with each additional CPA pulse resulting in scan of trunks 2 through 9 inclusive. If any of these trunks are available and are enabled and idle the scan will be stopped after the idle trunk has been determined in the manner described above.

After the last trunk (trunk 9) is scanned, and if it is not available, the ATS or all trunks scanned latch 30 must be set to stop the counter. This operation takes place when a true output appears on leads T1, T2, T4 and T8 of binary counter 20, all of which are gated through AND gate 31, presenting a true input to ATS latch 30. Inasmuch as the latch was previously reset the ATS latch will now set on the occasion of receipt of the next CPB pulse from the control equipment. Setting of latch 30 will cause a true output on its S lead extending to OR gate 60 whose output is inverted and therefore indicates a false output blocking the incoming scan signals at gate 10, thus starting binary counter 20.

If path selection on this call subsequently fails, the register will eventually request a second attempt, and the control equipment will apply a true condition on the reverse scan lead. At inverter 50 a zero or false output will be extended to AND gates 51 through 58 inclusive blocking them from operation at this time. A true input on the reverse scan lead is applied directly to the inputs of gates 61 through 68 inclusive, each of which has a second input connected to binary counter 20.

After the failure of the first attempt a reset pulse will be applied to the binary counter 20 to set it to zero as well as to latch circuits 30 and 40, causing them to both operate to their reset condition. The setting of both latches 30 and 40 to their zero or reset condition will cause an output to appear at the input of gate 10, or in combination with scan input it will act to actuate binary counter 20 again. With binary counter 20 reset and the output of gate 10 being true, binary counter 20 will be incremented to its first count placing a one or true signal on the T1 output, on the occasion of the next CPA clock pulse. As may be noted the true output from binary counter on lead T1 will now be conducted through gate 62 and blocked at gate 52. Since gate 62 is enabled a true input will not be applied to OR gate 71 with an output resulting on lead ANOT/A which is applied to the input of gate 80.

At this point it should be noted that the scan in the reverse mode at this stage does not actuate gate 89; not until a fifth pulse has been received from the binary counter will conditions be such that gate 89 is enabled. It is at the fifth count a true signal will be present at gates 71, 74, 75 and 78. At that time the coincidence outputs of all those gates will result in a true output from gate 89 resulting in a scan signal to trunk No. 9. This asymmetric scan is established so that minimum time is required in the forward mode with additional time being required for the reverse mode of scan. On the occasion of the sixth pulse true outputs will be present on leads T2 and T4 from the binary counter which along with true conditions on leads F1 and F8 will cause operation of gate 88 (not shown resulting in application of a scan signal to trunk 8.

As previously if a trunk to which a scan signal is applied is not idle and enabled, the scan will continue until such time as a trunk is found that is both idle and enabled. If the reverse scan continues from nine through one and no available trunk is found, once again ATS/30 will be set by virtue of the presence of true conditions on leads T1, T2, T4 and T8 of the binary counter 20. This resetting of latch 30 will block gate 10 of the incoming scan signal and the scan will be terminated. The completion of the reverse scan by the control equipment will be recognized as a busy trunk condition and no further scan will take place of those trunks in the present groups. The following table sets forth the particular outputs of binary counter 20 during both forward and reverse modes for accessing trunks within the group to which the present circuitry is connected.

TABLE OF COUNTER OUTPUTS (1 = true, 0 = false)

| Counter Output | Trk. Scan (Forward) | Trk. Scan (Reverse) | Counter Condition |
|---|---|---|---|
| 0000 | | | Reset |
| 0001 | 0 | | |
| 0010 | 1 | | |
| 0011 | 2 | | |
| 0100 | 3 | | |
| 0101 | 4 | 9 | |
| 0110 | 5 | 8 | |
| 0111 | 6 | 7 | |
| 1000 | 7 | 6 | |
| 1001 | 8 | 5 | |
| 1010 | 9 | 4 | |
| 1011 | | 3 | |
| 1100 | | 2 | |
| 1101 | | 1 | |
| 1110 | | 0 | |
| 1111 | | | All Trks. Scanned |

While but a single embodiment has been described with the present invention, it will be obvious to those skilled in the art that numerous modifications and variations may be made within the spirit and scope of the present invention which should only be limited by the claims appended hereto.

What is claimed is:

1. A telephone system including common control means, a pulse source, a plurality of trunks, and means connected to said common control means, to said pulse source, and to said trunks, for scanning each of said trunks to determine the busy or idle condition of said trunks and in response to determination of an idle condition of one of said trunks, transmitting a signal to said one trunk, said scanning means comprising: a counter connected to said control means and to said pulse source, enabled in response to said control means and operated after enabling in response to said pulse source; decoding means including a plurality of output circuit connections each connected to a different one of said trunks; and gating means connected between said counter and said decoding means, initially operated in response to said counter to conduct output signals to said decoding means, whereby said decoding means transmit signals to said trunks in a first sequence, said gating means further operated in response to said counter to conduct output signals to said decoding means in response to completion of transmission of said first sequence of signals, whereby said decoding means transmit signals to each of said trunks in a second sequence.

2. A telephone system as claimed in claim 1 wherein: there is further included advance means connected between said decoding means and said counter and including circuit connections to said trunks, operated in response to transmission of a signal from said decoding means to a trunk in the idle condition, to terminate the operation of said counter.

3. A telephone system as claimed in claim 1 wherein: said trunks are conditioned for operation in response to said common control means and wherein there is further included advance means connected between said decoding means and said counter and including circuit connections to each of said trunks; said advance means operated in response to transmission of a signal to a conditioned trunk in the idle condition, to terminate the operation of said counting means.

4. A telephone system as claimed in claim 1 wherein: there is further included second gating means connected to said counter, operated in response to said counting means operating to a maximum count, to terminate the operation of said counter.

5. A telephone system as claimed in claim 1 wherein: said counter is of the binary type.

6. A telephone system as claimed in claim 1 wherein: said decoding means comprise a plurality of gate circuits each connected to a different one of said trunks and each including a plurality of input circuits connected through said gating means to said counter.

7. A telephone system as claimed in claim 1: wherein said gating means comprise a first plurality of gate circuits operable to connect output signals from said counter to said decoding means in a first sequence and a second plurality of gate circuits operable to connect said counter to said decoding means in a second sequence.

8. A telephone system as claimed in claim 7 wherein: said first plurality of gate circuits are initially enabled in response to said common control means and said second plurality of gate circuits are operated after operation of said first gate circuits, in response to said common control means.

9. A telephone system as claimed in claim 7 wherein: there is further included a third plurality of gate circuits each including an input circuit connection to one of said first plurality of gate circuits and a second input connection to each of said second plurality of gate circuits, said third plurality of gate circuits each including an output circuit connected to said decoding means.

* * * * *